United States Patent
Dhanoa et al.

(10) Patent No.: US 8,768,349 B1
(45) Date of Patent: Jul. 1, 2014

(54) REAL-TIME SUBSCRIBER PROFILE CONSOLIDATION SYSTEM

(75) Inventors: Shingara Singh Dhanoa, Overland Park, KS (US); Douglas Ray Green, Lenexa, KS (US); David Uel McKinney, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1585 days.

(21) Appl. No.: 12/109,016

(22) Filed: Apr. 24, 2008

(51) Int. Cl.
*H04W 4/00* (2009.01)

(52) U.S. Cl.
USPC ............... 455/432.2; 455/432.3; 455/433; 709/230; 707/610

(58) Field of Classification Search
None
See application file for complete search history.

(56) References Cited

U.S. PATENT DOCUMENTS

| | | | |
|---|---|---|---|
| 6,134,544 A * | 10/2000 | Glitho et al. ............... | 455/436 |
| 6,950,876 B2 * | 9/2005 | Bright et al. ............... | 709/230 |
| 2003/0084075 A1 * | 5/2003 | Balogh et al. ............... | 707/204 |
| 2004/0024808 A1 * | 2/2004 | Taguchi et al. ............... | 709/203 |
| 2005/0037752 A1 * | 2/2005 | Kwan et al. ............... | 455/432.3 |
| 2005/0037787 A1 * | 2/2005 | Bachner et al. ............... | 455/502 |
| 2006/0112110 A1 * | 5/2006 | Maymir-Ducharme et al. ............... | 707/100 |
| 2006/0136519 A1 * | 6/2006 | Batta et al. ............... | 707/204 |
| 2008/0109445 A1 * | 5/2008 | Williams et al. ............... | 707/10 |
| 2008/0275883 A1 * | 11/2008 | Ashraf et al. ............... | 707/10 |

* cited by examiner

*Primary Examiner* — German J Viana Di Prisco (57) ABSTRACT

A method, system, and medium are provided for consolidating subscriber information from one or more data stored located within a mobile telecommunications network. The subscriber information may include, for example, a subscriber's service attributes or identifying information. As each data store may use a different protocol to communicate with the network, the system has the capability to identify the protocol used by each data store to allow for communication between each data store and the network. In addition, as each data store may store the subscriber information in a different format, the system identifies the schema used by each data store so that the subscriber information may be consolidated into a single schema to generate a unified subscriber profile, thus providing for efficient and effective customer service by a service provider.

19 Claims, 4 Drawing Sheets

REAL-TIME SUBSCRIBER PROFILE CONSOLIDATION SYSTEM

SUMMARY

The present invention is defined by the claims below. This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention provide systems, methods, and computer-readable media for, among other things, generating a unified subscriber profile by consolidating subscriber information stored at one or more data stores distributed throughout a mobile telecommunications network. Embodiments of the present invention have several practical applications in the technical arts including, but not limited to, presenting customer services representatives or agents of a mobile telecommunications service provider a consolidated profile for subscribers upon request.

Accordingly, in one aspect, one or more computer-readable media for creating a unified subscriber profile comprising subscriber information from a plurality of data stores located within a mobile telecommunications network is provided. The method includes receiving subscriber information from the plurality of data stores within the mobile telecommunications network, wherein at least two of the data stores include different types of data, and wherein at least two of the data stores structure the data according to a different schema. In addition, the method includes consolidating the subscriber information to generate the unified subscriber profile, storing the unified subscriber profile in a unified subscriber profile data store, receiving a request from a user to view at least a portion of the subscriber information in the unified subscriber profile, and presenting the at least a portion of the subscriber information from the unified subscriber profile to the user.

In another aspect, a system for creating a unified subscriber profile comprising subscriber information extracted from a plurality of data stores located within a mobile telecommunications network is provided. The method includes a plurality of data stores within the mobile telecommunications network that store subscriber information wherein each of the data stores includes different types of data, and wherein each of the data stores structures the data according to a different schema. The system also includes an interfacing component that interfaces with the plurality of data stores to request the subscribe information from the plurality of data stores, and a consolidation component that consolidates and reformats the subscriber information received from the plurality of data stores into a common schema, wherein consolidating the subscriber information comprises generating a unified subscriber profile. In addition, the system includes a unified subscriber profile data store that stores the unified subscriber profiles, and a presentation component that presents at least a portion of the subscriber information from the unified subscriber profile to a user upon request.

In a further aspect, one or more computer-readable media for creating a unified subscriber profile comprising subscriber information extracted from a plurality of data stores located within a mobile telecommunications network is provided. The method includes determining a schema of one or more of a plurality of data stores within a mobile telecommunications network, and accessing the subscriber information based on the schema, wherein the subscriber information comprises one or more of a subscriber's service attributes with a service provider, identifying information, one or more Internet Protocol (IP) addresses associated with the subscriber, or e-mail addresses associated with the subscriber. In addition, the method includes formatting the subscriber information and generating a unified subscriber profile.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AAA | Authentication, Authorization, and Accounting |
| CD-ROM | Compact Disk Read Only Memory |
| CDMA | Code Division Multiple Access |
| DVD | Digital Versatile Discs |

| | |
|---|---|
| EAP | Extensible Authentication Protocol |
| EEPROM | Electrically Erasable Programmable Read Only Memory |
| FAX | Facsimile |
| HLR | Home Location Register |
| HSS | Home Subscriber Server |
| HTML | HyperText Markup Language |
| IP | Internet Protocol |
| LAN | Local Area Network |
| LDAP | Lightweight Directory Access Protocol |
| MMS | Multimedia Messaging |
| PDA | Personal Digital Assistant |
| PDSN | Packet Data Serving Node |
| PEAP | Protected Extensible Authentication Protocol |
| PPP | Point-to-Point Protocol |
| RADIUS | Remote Authentication Dial In User Service |
| RAM | Random Access Memory |
| ROM | Read Only Memory |
| TACACS | Terminal Access Controller Access-Control System |
| TV | Television |
| XML | Extensible Markup Language |

Further, various technical terms are used throughout this description. A definition of such terms can be found in Newton's Telecom Dictionary by H. Newton, 23rd Edition (2007). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

Embodiments of the present invention may be embodied as, among other things, a method, system, or computer-program product. Accordingly, the embodiments may take the form of a hardware embodiment, a software embodiment, or an embodiment combining software and hardware. In some embodiments, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Figure 1:
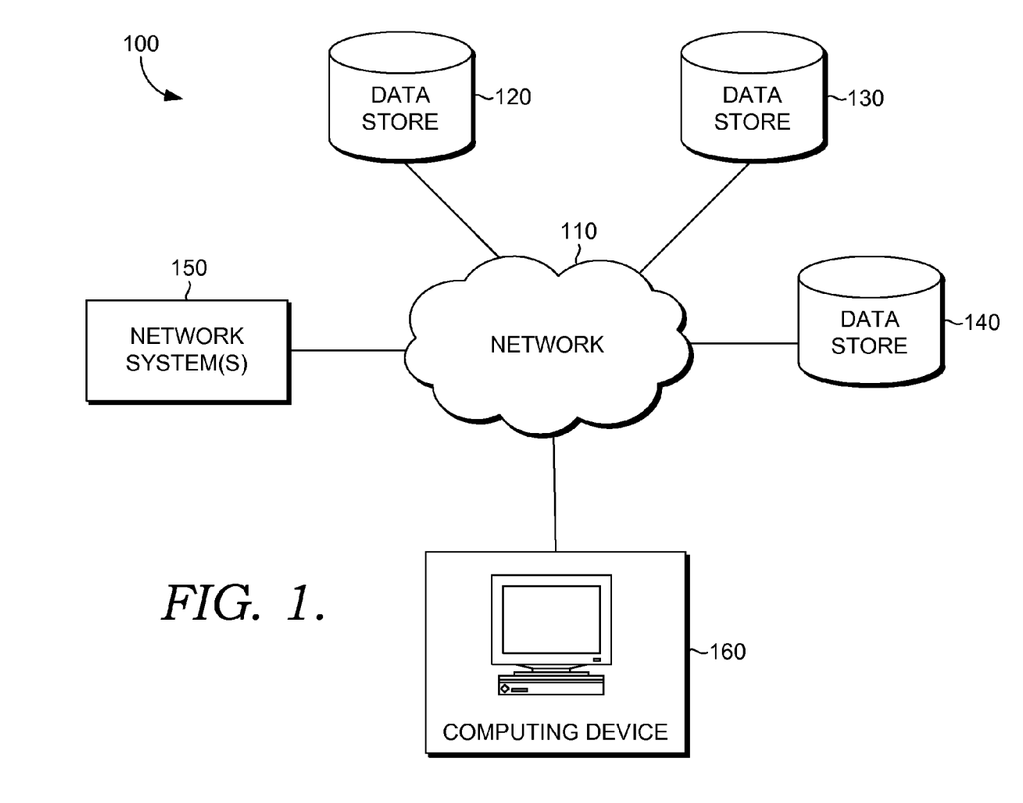
FIG. 1 is a schematic view of an exemplary computing environment suitable for use in implementing embodiments of the present invention.

Referring to the drawings in general, and initially to FIG. 1 in particular, an exemplary network environment suitable for use in implementing embodiments of the present invention is illustrated and designated generally as reference numeral 100. Network environment 100 is but one example of a suitable network environment and is not intended to suggest any limitation as to the scope of use or functionality of the invention. Neither should the network environment 100 be interpreted as having any dependency or requirement relating to any one or combination of components illustrated. Network environment 100 may include one or more networks 110, one or more data stores 120, 130, and 140, one or more network systems 150, and a computing device 160. Further, the data stores 120, 130, and 140, the network systems 150, and the computing device may be connected to network 110 via other networks such as a local area network (LAN), a wide area network (WAN), or a wireless telecommunications network.

Data stores 120, 130, and 140 are configured to store information related to subscribers of a service, such as a mobile telecommunications service, for example, which may be provided by a service provider. This subscriber information may include, for example, personal information about the subscriber, information about the subscriber's services as provided by the service provider, or information about the subscriber's usage of the service. A subscriber's services may include, for example, a specified calling plan, voicemail, multimedia messaging (MMS), e-mail, or the like. Three data stores are illustrated in FIG. 1, but it is understood that the present invention may operate with less or more than three data stores. Three data stores are shown for exemplary purposes only. Further, data stores 120, 130, and 140 may each use a different protocol to communicate with the network, and each may store data differently (e.g., different schema).

Network system 150 may include one system or may include more than one system. Network system 150 may be configured to, for example, consolidate data from data stores 120, 130, and 140 (e.g., formatting data from different schemas into a common schema), create a unified subscriber profile, present the unified subscriber profile to a user upon request, request new or updated subscriber information from data stores 120, 130, and/or 140, receive indications that data stores 120, 130, and/or 140 contain new or updated subscriber information, and the like.

Computing device 160 may be used to access information from a unified subscriber profile and present the information to a user. In addition, computing device 160 may be any type of computing device, such as, but not limited to a personal computer, desktop computer, laptop computer, handheld device, mobile handset, consumer electronic device, and the like. Additionally, the computing device 160 may further include a keyboard, keypad, stylus, joystick, and any other input-initiating component that allows a user to provide wired or wireless data to the network 110. The invention may be practiced in a variety of system configurations, including hand-held devices, consumer electronics, general-purpose computers, more specialty computing devices, communication devices, mobile communications devices, etc. It should be noted, however, that the present invention is not limited to implementation on such computing devices, but may be implemented on any of a variety of different types of computing devices within the scope of embodiments hereof.

Figure 2:
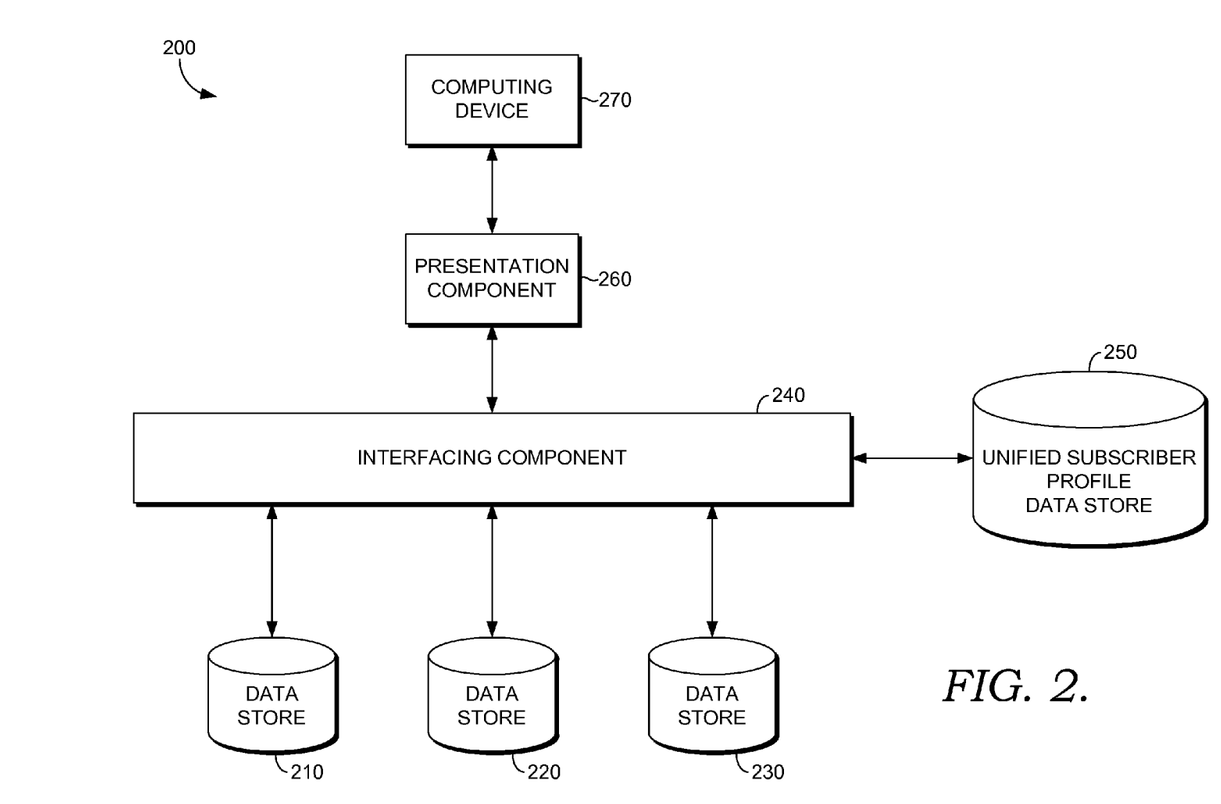
FIG. 2 is an exemplary system for creating a unified subscriber profile comprising subscriber information from a plurality of data stores located within a mobile telecommunications network, according to an embodiment of the present invention.

Referring now to FIG. 2, an exemplary system 200 that illustrates creating and accessing a unified subscriber profile comprising subscriber information from a plurality of data stores located within a mobile telecommunications network, according to an embodiment of the present invention. The system also includes one or more data stores, such as data stores 210, 220, and 230, which are configured to store information related to service subscribers, such as a mobile telecommunications service, for example, which may be provided by a service provider. This subscriber information may include, for example, personal information about the subscriber, information about the subscriber's services as provided by the service provider, or information about the subscriber's usage of the service. A subscriber's services may include, for example, a specified calling plan, voicemail, multimedia messaging (MMS), e-mail, or the like.

Each data store may communicate with the network and other network systems using a different protocol, and may store data in a different data format/schema. In one embodiment, a data store may be an Authentication, Authorization, and Accounting (AAA) data store, which is used for access control. AAA identifies unique users, authorizes the level of service, and tracks the usage mode of resources, and may include any data-related information, such as IP addresses associated with the subscribers, unique identifiers for those subscribers in the network, or e-mail addresses for the subscribers, which allows the service provider to know that a subscriber belongs to the network.

In another embodiment, a data store may be a Home Location Register (HLR), which is on the circuit switch side and holds subscription information about every subscriber in a mobile telecommunications network. HLR is also used when a subscriber makes a call within the area of coverage, and is used to verify a subscriber's legitimacy and to support the features to which the subscriber subscribes when roaming outside of the home area. Similarly, HLR stores details of every Subscriber Identity Module (SIM) card issued by the service provider.

In still another embodiment, a data store may be a Home Subscriber Server (HSS), which stores subscriber information in relation to Internet Protocol (IP) multimedia services (MMS). HSS also supports Internet Multimedia Subsystem (IMS) in that it handles calls and contains subscription-related information, and can provide information about the user's physical location. AAA, HLR, and HSS, as well as any other data store or server, may use one or more protocols, such as DIAMETER, Remote Authentication Dial In User Service (RADIUS), Terminal Access Controller Access-Control System (TACACS), TACACS+, Point-to-Point Protocol (PPP), Extensible Authentication Protocol (EAP), Protected EAP (PEAP), Lightweight Directory Access Protocol (LDAP), or the like. It should be apparent to one skilled in the art that any data store or server may be used, in combination with any protocol suitable for use with a particular data store or server.

An interfacing component 240 is capable of interfacing with each of the data stores 210, 220, and 230, which, as previously mentioned, may each communicate with the network and network systems using a different protocol, such as DIAMETER, RADIUS, TACACS, TACACS+, PPP, EAP, PEAP, LDAP, etc. Interfacing component 240 is aware of which protocol(s) is used by each data store, as well as what type of information is stored in each, and how that data is stored (e.g., schema), and thus may effectively communicate with the data stores. Further, in one embodiment, interfacing component 240 may request and receive new or updated subscriber information from the data stores when this information is available. In another embodiment, interfacing component 240 may also receive an indication from each data store when new or updated subscriber information becomes available. After an indication is received, interfacing component 240 may, via the protocol used by the particular data store, request and receive the new or updated subscriber information.

Not only is interfacing component 240 able to identify and communicate with each data store via a particular protocol(s), but it may also be capable of identifying the schema used by each data store, as data stores may store data in different formats (e.g., different schema). To create a unified subscriber profile, the subscriber information may be consolidated into a single schema, and this may be done by either interfacing component 240, or a separate component, such as a consolidation component, which may consolidate and reformat the subscriber information received from each of the data stores into a common schema. From here, a unified subscriber profile may then be generated.

An example of a unified subscriber profile schema construct is as follows:
<SPC-ID>, <PSH or PUL>, <#of source system segments>, <source system ID>, <Update time>,<data1>,<data2>, <data3>,<partition>, <Source System ID>, <Update time><data1>,<data2>,<data3>,<termination flag>

<SPC-ID> may be a unique identifier that identifies the subscriber without personally identifying the subscriber by name, or any other means that may personally identify the subscriber. Any type of identifier may be used, as long as the identifier differentiates one subscriber from another. <PSH or PUL> indicates the method used by a network system (e.g., interfacing component) to supply the data to another system. PSH is push, wherein information, such as updated information, is sent to the system without a request from the system. PUL is pull, wherein information is requested by the system and the information is sent back to the system. <#of source system segments> provides a count of how many different system segments (e.g., data stores) are combined to provide the information in the unified subscriber profile. <Source system IDs> identifies the specific source system (e.g., data store) that the subscriber data has been obtained from. This assists when updated information is requested, and the request can be sent to the specific source system (e.g., data store) where the information first came from. <Update time> is an optional field, but provides an indication of the last update of the specific source data. <Datax fields> are specific data elements that have been selected from the original source system. <Partition> delineates between each different source record of the message stream, which may be used if there is redundancy between source systems (e.g., data stores). Lastly, <Termination> flag identifies the end of the message stream. A network system (e.g., interfacing component) can also append a write flag value to notify users whether the information associated with a specific <datax> field is writeable, or whether it may be updated.

Unified subscriber profile data store 250 may store the unified subscriber profiles once generated by the interfacing component 240. Subscriber information within the unified subscriber profiles may be transferred between the interfacing component 240 and unified subscriber profile data store 250 using any format, such as, but not limited to Extensible Markup Language (XML). XML facilitates the sharing of structured data across different information systems, and is used both to encode documents and to serialize data.

Presentation component 260 determines which portion of the subscriber information to present to a user and how to present it on computing device 270 upon request from a user. Presentation component 260 also understands where the unified subscriber profile is stored in the system. A user, such as a customer service representative or agent may, in speaking with a subscriber, need to view or even edit a portion of the subscriber information in a subscriber's profile. In this case, the user may request to be presented with at least a portion of the subscriber information from the unified subscriber profile for a particular subscriber. Presentation component 260 is configured to be capable of providing the user with this information utilizing a user interface.

Lastly, computing device 270 may be any computing device that a user (e.g., customer representative or customer agent) may utilize to perform his or her necessary functions and services (e.g., provide customer service to a subscriber).

Computing device 270 may be any type of computing device, such as, but not limited to a personal computer, desktop computer, laptop computer, handheld device, mobile handset, consumer electronic device, and the like. In some embodiments, the user may be able to edit or update at least a portion of the subscriber information within the unified subscriber profile (e.g., in order to correct a problem that the subscriber is having with the service). When any subscriber information is edited or updated, this edited or updated information may be sent back through the various components of the system (e.g., presentation component 260, interfacing component 240) so that the unified subscriber profile itself may be updated in the unified subscriber profile data store 250, and also so that the appropriate data store (e.g., such as data store 210, 220, or 230) may also be properly updated. In this regard, subscriber information may be sent in both directions throughout each component of the present invention, as illustrated in FIG. 2. In some instances, at least a portion of the subscriber information may not be editable or updatable by the user. Computing device 270 may communicate with presentation component 260 or interfacing component 240 via the internet, in some embodiments, such as by HyperText Markup Language (HTML).

The present invention may be implemented, for example, in a customer service environment for a mobile telecommunications service provider. In one instance, a subscriber to a mobile telecommunications service may require assistance with a service related issue, and may either call or visit in person with a customer service representative regarding that issue. In order to assist the subscriber, the customer service representative may need to view information about the subscriber and/or the subscriber's service, such as which services the subscriber has, which may include a specific call plan, long-distance calling, voice mail, call forwarding, multi-media messaging, such as text messaging, or the like. Currently, the customer service representative may have to request this subscriber information from many data stores throughout the mobile telecommunications network, which can be a time consuming process. By utilizing the present invention that consolidates subscriber information and presents this information to a customer service representative with a single request rather than several requests to various data stores, the customer service experience greatly improves for both the customer service representative and the subscriber, or customer. More specifically, allowing a customer service representative to request subscriber information that has already been consolidated with other information associated with that same subscriber drastically cuts down on the time that it takes to request and receive the information, creating a more efficient and effective customer service experience.

Figure 3:
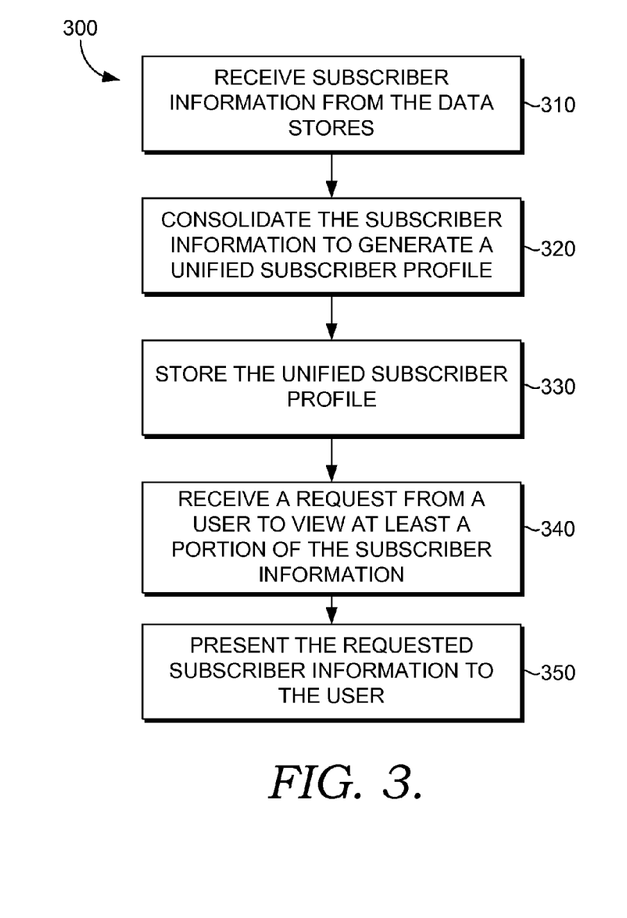
FIG. 3 is an exemplary flow diagram that illustrates creating a unified subscriber profile comprising subscriber information from a plurality of data stores located within a mobile telecommunications network, according to an embodiment of the present invention.

Turning to FIG. 3, an exemplary flow diagram is provided that illustrates a method 300 for creating a unified subscriber profile comprising subscriber information from a plurality of data stores located within a mobile telecommunications network, according to an embodiment of the present invention. Step 310 indicates that subscriber information is received from one or more data stores within a mobile communications network, such as data stores 210, 220, or 230 in FIG. 2. In some embodiments, a request may be made for the subscriber information prior to receiving this information. Each data store may contain different types of subscriber information, which may be stored according to a different schema, as previously discussed, depending on which data store is being used to store the information. As such, the subscriber information may be consolidated, as indicated at step 320, to generate the unified subscriber profile. This may be done, for example, by the interfacing component 240 in FIG. 2. Interfacing component 240 understands the schema used by each data store, and also is aware of which protocol(s) the data stores use to communicate, and thus may consolidate and reformat the subscriber information into a single schema.

At step 330, the unified subscriber profile is stored in a unified subscriber profile data store, such as unified subscriber profile data store 250 in FIG. 2, for example. The subscriber information may be transferred between the interfacing component 240 and unified subscriber profile data store 250 using XML, for example. Other forms of data transfer may also be used. Step 340 indicates that a request is received from a user (e.g., customer service representative or agent) to view at least a portion of the subscriber information, and this information is presented to the user from the unified subscriber profile at step 350.

As previously described, subscriber information may be periodically updated or added to any of the data stores, and therefore in order to maintain an updated unified subscriber profile, the profile and data stores are periodically synched. In some embodiments, it may be determined if any of the data stores have new or updated subscriber information. If so, the new or updated subscriber information may be accessed by the system, and the unified subscriber profile may be updated. If a particular data store does not have new or updated subscriber information, it is not necessary to perform any further action in regard to that particular unified subscriber profile. In these embodiments, it may be determined if any of the data stores have new or updated subscriber information at a predetermined interval (e.g., 5 seconds, 1 minute, 30 minutes, 1 day, etc.). In other embodiments, an indication may be received from each of the data stores when it has new or updated subscriber information in regard to either any information that it contains, or in regard to a particular subscriber so that the unified subscriber profile may be updated. Here, once an indication (e.g., flag) is received, the new or updated subscriber information may be requested from each of the data stores that have given the indication, and the new or updated subscriber information may then be received.

In some embodiments, the user may be able to edit or update at least a portion of the subscriber information within the unified subscriber profile (e.g., in order to correct a problem that the subscriber is having with the service). When any subscriber information is edited or updated, this edited or updated information may be sent back through the various components of the system (e.g., presentation component 260, interfacing component 240) so that the unified subscriber profile itself may be updated in the unified subscriber profile data store 250, and also so that the appropriate data store (e.g., such as data store 210, 220, or 230) may also be properly updated.

Figure 4:
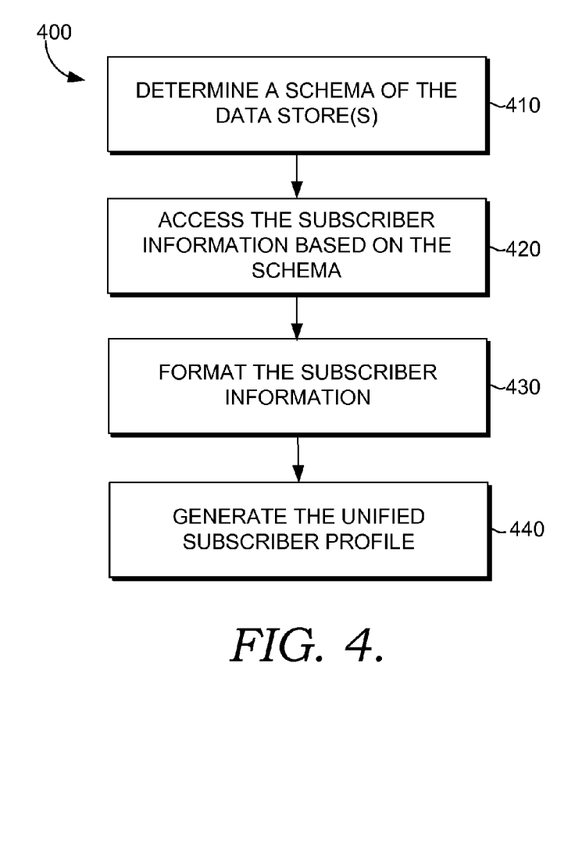
FIG. 4 is an exemplary flow diagram that illustrates creating a unified subscriber profile comprising subscriber information from a plurality of data stores located within a mobile telecommunications network, according to another embodiment of the present invention.

FIG. 4 is an exemplary flow diagram illustrating a method 400 for creating a unified subscriber profile comprising subscriber information from a plurality of data stores located within a mobile telecommunications network, according to another embodiment of the present invention. Step 410 indicates that a schema may be determined for one of a number of data stores so that subscriber information may be accessed, as indicated at step 420, based on that schema. The subscriber information may include, but is not limited to a subscriber's service attributes with a service provider, a subscriber's identifying information (e.g., IP address, e-mail address, payment information, home address, social security number, etc.), or the like. Accessing the subscriber information may be performed by the interfacing component 240, for example, which may be capable of understanding which protocol that a particular data store uses to communicate with other network systems. For instance, the data stores may each communicate with the network and network systems using a different protocol, such as DIAMETER, RADIUS, TACACS, TACACS+, PPP, EAP, PEAP, LDAP, or the like. The interfacing component 240 is configured to know which protocol is required by each data store, and can then access the subscriber information using the appropriate protocol.

Step 430 indicates that the subscriber information received from the data stores is formatted. Formatting the subscriber information may involve consolidating the subscriber information from one or more schemas, which may each be in a different format, to a single or unified schema. Once the subscriber information has been formatted into single schema, the unified subscriber profile may be generated at step 440. In some embodiments, a request is received from a user to view the subscriber information, and the unified subscriber profile may then be presented to the user. The user, in some embodiments, may be a customer service representative or agent, who may be assisting a subscriber with a particular issue or problem, such as a service related problem. In some embodiments, the user may be able to edit or update at least a portion of the subscriber information within the unified subscriber profile (e.g., in order to correct a problem that the subscriber is having with the service). When any subscriber information is edited or updated, this edited or updated information may be sent through the various components of the system (e.g., presentation component 260, interfacing component 240) so that the unified subscriber profile itself may be updated in the unified subscriber profile data store 250, and also so that the appropriate data store (e.g., such as data store 210, 220, or 230) may be properly updated.

Subscriber information, as previously discussed, may be periodically updated or added to any of the data stores, and therefore in order to maintain an updated unified subscriber profile, the profile and data stores are periodically synched. As described above, in some embodiments, it may be determined if any of the data stores have new or updated subscriber information and if so, the new or updated subscriber information may be accessed by the system so that the unified subscriber profile may be updated. This determination may be at a pre-determined interval (e.g., 5 seconds, 1 minute, 30 minutes, 1 day, etc.). In other embodiments, an indication (e.g., flag) may be received from each of the data stores when it has new or updated subscriber information in regard to either any information that it contains, or in regard to a particular subscriber so that the unified subscriber profile may be updated. The new or updated subscriber information may then be requested from each of the data stores that have given the indication, and the new or updated subscriber information may then be received.

Figure 5:
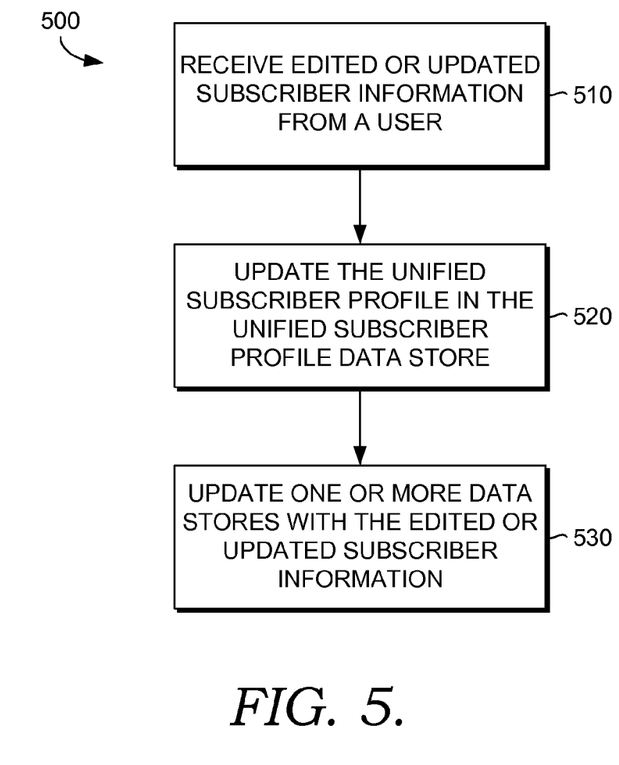
FIG. 5 is an exemplary flow diagram that illustrates updating a unified subscriber profile and one or more of a plurality of data stores located within a mobile telecommunications network upon receiving edited or updated subscriber information from a user, according to an embodiment of the present invention.

FIG. 5 is an exemplary flow diagram that illustrates a method 500 for updating a unified subscriber profile and one or more of a plurality of data stores located within a mobile telecommunications network upon receiving edited or updated subscriber information from a user, according to an embodiment of the present invention. As previously described, the user may be able to edit or update at least a portion of the subscriber information within the unified subscriber profile (e.g., in order to correct a problem that the subscriber is having with the service). At step 510, edited or updated subscriber information is receiver from a user (e.g., user's computing device). This edited or updated information may be sent through the various components of the system (e.g., presentation component 260, interfacing component 240) so that the unified subscriber profile itself may be updated in the unified subscriber profile data store 250, as indicated at step 520, and also so that the appropriate data store (e.g., such as data store 210, 220, or 230) may also be properly updated at step 530.

In one embodiment, the updating may automatically occur each time a change is made to the subscriber information for a particular subscriber. Each time a change is made, a signal or flag may be sent to interfacing component 240, for example, which may update the unified subscriber profile stored in unified subscriber profile data store 250, and may also update any data store, such as data store 210, 220, or 230, that stores the type of subscriber information that has been updated. In another embodiment, one of the components or systems of the present invention may periodically check for updated information by comparing subscriber information in a unified subscriber profile with subscriber information in one or more data stores.

As the system of the present invention, such as interfacing component 240, may be configured to know which protocol each data store uses to communicate, and also how each data store formats and stores data (e.g., what type of schema is used by each data store), the system may also know what type of data is stored by each type of data store. For example, HLR data stores hold subscription information about every subscriber. If this type of information is edited or updated by a user, the system may know which data store(s) the information is located in, and may update the data store(s) accordingly. In some instances, there may be more than one of the same type of data store (e.g., more than one AAA, HLR, or HSS data store), and the system may know to look for the information that needs to be updated in only the HLR data stores, for example.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of creating a unified subscriber profile comprising subscriber information from a plurality of data stores located within a mobile telecommunications network, the method comprising:

determining a communication protocol for each of a plurality of data stores within the mobile telecommunications network that stores data relevant to a particular user for whom the unified subscriber profile is being created;

using the determined communication protocol for each of the plurality of data stores, receiving subscriber information from the plurality of data stores within the mobile telecommunications network, wherein at least two of the plurality of data stores include different types of data, and wherein the at least two of the plurality of data stores include two or more of an Authentication, Authorization, and Accounting (AAA) data store, a Home Location Register (HLR), and a Home Subscriber Server (HSS);

determining that two or more of the plurality of data stores store the subscriber information in different schemas such that the subscriber information is in different formats;

reformatting the subscriber information from the plurality of data stores so that the subscriber information is in a same schema and a same format;

consolidating the subscriber information into the same schema to generate the unified subscriber profile;

storing the unified subscriber profile in a unified subscriber profile data store;

periodically updating the subscriber information in the unified subscriber profile by syncing the unified subscriber profile with the first and the second of the one or more of the plurality of data stores to receive updated subscriber information into the unified subscriber profile;

receiving a request from a user to view at least a portion of the subscriber information in the unified subscriber profile; and presenting the at least a portion of the subscriber information from the unified subscriber profile to the user.

2. The computer-readable media of claim 1, further comprising:
requesting the subscriber information from the plurality of data stores.

3. The computer-readable media of claim 1, further comprising:
updating the subscriber information in the unified subscriber profile.

4. The computer-readable media of claim 3, wherein updating the subscriber information in the unified subscriber profile further comprises:
determining if one of the plurality of data stores has new or updated subscriber information;
if the one of the plurality of data stores has the new or updated subscriber information, accessing the new or updated subscriber information; and
if the one of the plurality of data stores does not have the new or updated subscriber information, not accessing the new or updated subscriber information.

5. The computer-readable media of claim 4, wherein determining that one of the plurality of data stores has new or updated subscriber information occurs at a pre-determined time interval.

6. The computer-readable media of claim 3, wherein updating the subscriber information in the unified subscriber profile further comprises:
receiving an indication from each of the plurality of data stores when the new or updated subscriber information is available;
requesting the new or updated subscriber information from each of the plurality of data stores that have provided the indication; and
receiving the new or updated subscriber information.

7. The computer-readable media of claim 1, further comprising:
determining a protocol for one or more of the plurality of data stores, wherein the subscriber information is received from the one or more of the plurality of data stores according to the determined protocol.

8. The computer-readable media of claim 1, further comprising:

allowing the user to edit or update at least a portion of the subscriber information in the unified subscriber profile to generate edited or updated subscriber information.

9. The computer-readable media of claim 8, further comprising:
updating one or more of the plurality of data stores in accordance with the edited or updated subscriber information.

10. The computer-readable media of claim 1, wherein the user is a customer service representative.

11. A system for creating a unified subscriber profile comprising subscriber information from a plurality of data stores located within a mobile telecommunications network, the system comprising:
a plurality of data stores within the mobile telecommunications network that store subscriber information, wherein at least two of the plurality of data stores include different types of data, and wherein at least two of the plurality of data stores employ different schemas for storing the data;
an interfacing component that interfaces with the plurality of data stores to request and receive the subscriber information from the plurality of data stores, wherein at least two of the plurality of data stores utilize different protocols for accessing the subscriber information, and wherein the interfacing component periodically updates the subscriber information in the unified subscriber profile by syncing the unified subscriber profile with the plurality of data stores to receive updated subscriber information into the unified subscriber profile;
a consolidation component that consolidates and reformats the subscriber information received from the plurality of data stores into a common schema, wherein consolidating the subscriber information comprises generating a unified subscriber profile;
a unified subscriber profile data store that stores the unified subscriber profiles; and
a presentation component that presents at least a portion of the subscriber information from the unified subscriber profile to a user upon request.

12. One or more non-transitory computer-readable media having computer-useable instructions embodied thereon for performing a method of creating a unified subscriber profile comprising subscriber information from a plurality of data stores located within a mobile telecommunications network, the method comprising:
determining a first schema of a first of one or more of the plurality of data stores within the mobile telecommunications network;
determining a second schema of a second of the one or more of the plurality of data stores within the mobile telecommunications network;
determining that the first and the second of the one or more of the plurality of data stores utilize different protocols for access to the subscriber information;
utilizing the different protocols, accessing the subscriber information from the first and the second of the one or more of the plurality of data stores based on the first and the second schemas, wherein the subscriber information comprises one or more of a subscriber's service attributes with a mobile telecommunications provider, a subscriber's identifying information, one or more Internet Protocol (IP) addresses associated with the subscriber, or an e-mail associated with the subscriber;
formatting the subscriber information into a single schema from the first and the second schemas;
generating the unified subscriber profile; and periodically updating the subscriber information in the unified subscriber profile by syncing the unified subscriber profile with the first and the second of the one or more of the plurality of data stores to receive updated subscriber information into the unified subscriber profile.

13. The computer-readable media of claim 12, wherein updating the subscriber information in the unified subscriber profile further comprises:

determining if one of the plurality of data stores has new or updated subscriber information;

if the one of the plurality of data stores has the new or updated subscriber information, accessing the new or updated subscriber information based on the schema of the one of the plurality of data stores; and if the one of the plurality of data stores does not have the new or updated subscriber information, not accessing the new or updated subscriber information.

14. The computer-readable media of claim 13, wherein determining if one of the plurality of data stores has new or updated subscriber information occurs at a pre-determined time interval.

15. The computer-readable media of claim 12, wherein updating the subscriber information in the unified subscriber profile further comprises:

receiving an indication from each of the plurality of data stores when the new or updated subscriber information is available;

requesting the new or updated subscriber information from each of the plurality of data stores that have provided the indication; and receiving the new or updated subscriber information.

16. The computer-readable media of claim 12, further comprising:

allowing the user to edit or update at least a portion of the subscriber information in the unified subscriber profile to generate edited or updated subscriber information.

17. The computer-readable media of claim 16, further comprising:

updating one or more of the plurality of data stores in accordance with the edited or updated subscriber information.

18. The computer-readable media of claim 12, further comprising:

receiving a request from a user to view at least a portion of the subscriber information in the unified subscriber profile; and presenting the at least a portion of the subscriber information from the unified subscriber profile to the user.

19. The computer-readable media of claim 18, wherein the user is a customer service representative.

* * * * *